April 15, 1969  B. A. GRUBER  3,438,816
TAPE FOR DRY TAPE FUEL CELL
Original Filed Jan. 8, 1964
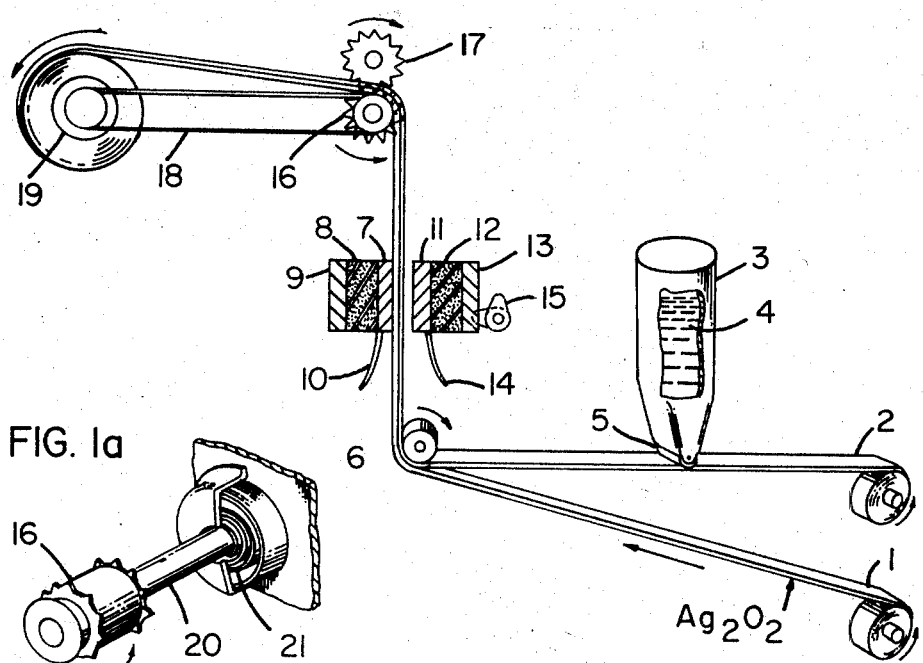
FIG. 1
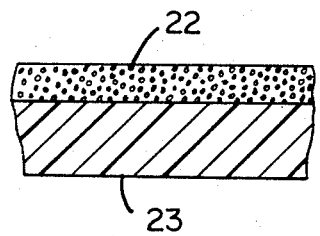
FIG. 1a
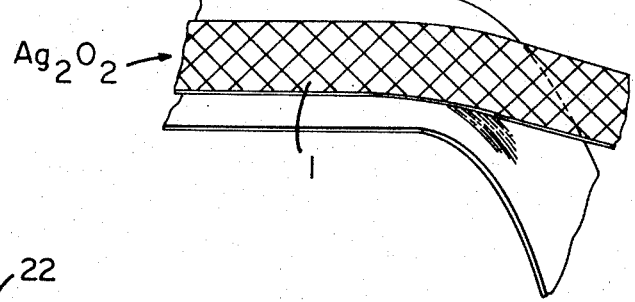
FIG. 3
FIG. 2
*INVENTORS*
BERNARD A. GRUBER
ATTORNEY: Lorna A Ferris United States Patent Office 3,438,816
Patented Apr. 15, 1969

3,438,816
TAPE FOR DRY TAPE FUEL CELL
Bernard A. Gruber, Boxford, Mass., assignor to Monsanto Research Corporation, St. Louis, Mo., a corporation of Delaware
Original application Jan. 8, 1964, Ser. No. 336,557, now Patent No. 3,293,080, dated Jan. 20, 1966. Divided and this application May 18, 1966, Ser. No. 558,157
Int. Cl. H01m 21/04
U.S. Cl. 136—111  2 Claims

ABSTRACT OF THE DISCLOSURE

A dry tape especially adapted for use in fuel cells of the type defined in U.S. Patent 3,260,620. The tape comprises a permeable substrate of an inert synthetic polymer and a coating of silver peroxide bound to the substrate by way of a water soluble binder.

---

This is a division of application Ser. No. 336,557, filed Jan. 8, 1964, now Patent No. 3,293,080.

The invention described herein was made in the performance of work under a NASA contract and is subject to the provisions of the National Aeronautics and Space Act of 1958, Public Law 85–568 (72 Stat. 426; 42 U.S.C. 2451), as amended.

This invention relates to fuel cells of the type defined in U.S. Patent 3,260,620 and, more particularly, provides a new and improved fuel cell having a moving separator tape feed, a novel method of operating a silver-zinc electrochemical cell employing a moving separator tape feed, and novel dry tape products adapted for use in the cell of this invention.

A fuel cell is a device for electrochemical generation of electricity which is provided with means to supply the chemicals by the reaction of which the electricity is generated, and means to remove the products of reaction. Primary cells, such as those used in a flashlight battery, last no longer than their self-contained supply of the electrochemical reagents. An automobile battery, which is an assembly of secondary cells, also operates on a self-contained, single charge of chemicals: it depends on frequent periodic recharging by a mechanical generator for prolonging its life. In contrast to these electrochemical cells, a fuel cell is not limited to the initial charge of chemicals, but instead the operating life of the cell is prolonged by addition of the reactants, and removal of the products.

The tape supplies silver peroxide to the cathode, at which the peroxide is electrochemically reduced to silver. The silver plates out on the tape. The anode supplies zinc which is electrochemically oxidized to a zinc oxide such as the hydroxide, which dissolves in the electrolyte wetting the tape. As the tape is moved out from between the cathode and anode sites, it carries away the silver and the zinc oxide which are the electrochemical reaction products.

Thus, in the present cell the electrochemical reactants are supplied and the products removed, providing an effectively operative fuel cell.

The essentials of the present fuel cell are a dry tape separator coated with silver peroxide, means for wetting said tape with electrolyte, cell electrodes comprising a zinc anode and an inert cathode, and means for moving said tape, wetted with electrolyte, past and in contact with said cell electrodes during operation of the cell.

A tape particularly adapted for the operation of the stated cell is also provided in accordance with this invention, comprising a permeable synthetic polymer substrate to which silver peroxide is adhered by a polymeric water-soluble binder.

The invention will be more readily understood from a consideration of the drawings in which FIGURE 1 is a diagrammatic side view of the electrochemical cell system of the invention;

FIGURE 1a is a perspective view of a drive system for advancing a tape in the electrochemical cell system of the invention;

FIGURE 2 is a diagrammatic side view of a dry tape separator adapted for use in operation of the presently provided fuel cell; and FIGURE 3 is a perspective view of a dual tape system for use in operation of the present fuel cell.

The tape-fed fuel cell of this invention is a silver/zinc cell, that is, an electrochemical cell in which silver peroxide, $Ag_2O_2$, is the cathode depolarizer, and zinc is the anode metal. Silver/zinc cells using this electrochemical system provide a high power output from a low weight of reactants. They have one disadvantage, however, which is that silver/zinc cells with electrolyte included have a very short storage life.

In a so-called dry cell, like the LeClanche cells used in flashlight batteries, in which the cathode depolarizer is manganese dioxide, loss of the depolarizer material is so slow that, although the depolarizer and the electrolyte are in contact within the cell, the cells have relatively long storage lives. Even after years, some of the manganese dioxide depolarizer is still available for the electrochemical reaction. On the other hand, with silver peroxide as a cathode depolarizer, it is not possible to provide such storable systems. After a few weeks or months, the silver/zinc cells have lost most or all of their electrical capacity. Instead, therefore, arrangements are made to wet the silver peroxide with electrolyte at the time when it is desired to utilize the cell, and not before. Once activated by addition of aqueous electrolyte, the cell life is short. It cannot be used intermittently over a long period of time like a flashlight cell.

The present fuel cell has the advantageous high power-per-weight output of silver/zinc cells, but is usable intermittently like a flashlight cell. Only the part of the silver peroxide carried by the tape which is being fed to the active electrode site is wetted, and the rest remains dry. The portion of the dry silver peroxide-coated tape which is not wetted remains unactivated and maintains its indefinite storage life.

Moreover, maintenance of the presently provided cells is as easy as replacing the cells in flashlight batteries. Fuel cells generally use liquid or gaseous reactants, which require special handling equipment. With the present cell, using a dry feed, renewing the cell is a simple matter of pulling out the used roll of tape and putting in a fresh one.

The efficiency of utilization of the cathode depolarizer in the present cell is high. The silver produced as the electrochemical reaction product by the silver peroxide cathode depolarizer is a conductive material. It thus provides a conducting path to the fixed cathode for silver peroxide which is not in direct contact with the cathode, through which this peroxide can participitate in the electrochemical reaction. Accordingly, substantially complete and economical use is made of the depolarizer supplied to the cell: close to 100% current efficiency is obtained in the present cell at current densities of 125 amperes per square foot.

As will be appreciated by those skilled in the art, the term cathode is used herein to designate the fixed cathode site. The anode of the present cell is made of an active metal, zinc, which participates in the electrochemical reaction. The inert cathode, however, is actually an electrode site, which acts as a current collector, while the silver peroxide on the tape is the active cathode material, referred to as the cathode depolarizer. If part of the silver peroxide is in contact with silver deposited on the tape as an electrochemical reaction product, which is in turn in contact with the inert cathode, then, although the silver peroxide itself is not touching the inert cathode, it can still participate in the cathode reaction, through its contact with the silver in the tape. In such case the deposited silver on the tape contacted by the silver peroxide is actually the active electrode. Nevertheless, the inert current collector can be and is usually called the cathodic electrode or cathode.

In preferred embodiments of the cell of this invention, means are provided for automatically advancing the coated tape between the electrodes. Preferred embodiments of the present cell also include a dual tape system, as described hereinafter.

In operation of the cell of this invention, the coated tape is advanced through the space between the electrodes, with the used-up tape exiting while new tape enters, on the principle of a fuel cell, with new reactants supplied as the old are consumed, accompanied by removal of reaction products. The tape may be moved past the electrodes steadily or intermittently: if the movement is intermittent, the tape will be advanced in a series of small jerks, so that the tape motion is substantially continuous.

If a section of the tape is moved under the electrodes and let stand there while the electrochemical reaction proceeds to completion, or nearly to completion, over that entire section, the power output will gradually decrease as the reactants in that section of the tape are used up. Ideally, a fuel cell is an invariant system, giving a steady power output, and few if any pieces of electrical equipment are desirably operated with an irregular power supply.

Letting the tape stand still between the electrodes, moreover, also produces fouling on the anode.

When the coated tape is wetted with electrolyte, silver compounds dissolving in the electrolyte can migrate through the tape allowing silver ions to reach the zinc electrode as this electrode is contacted by the wetted tape. Silver ions reaching the zinc electrode are reduced there to metallic silver, and the metallic silver then deposits on the zinc surface. Upon prolonged operation of the cell with such deposition occurring, the zinc anode can become covered with a plating of silver. This will prevent further operation of the cell.

To avoid deposition of silver on the zinc anode while the present cell is not in operation, means are preferably provided for moving the zinc anode into and out of contact with the tape separator. When the cell is in operation to provide electric current, the zinc anode must contact the separator tape. When the cell is not being used to generate power, removing the zinc anode from contact with the tape will prevent deposition of silver on it while the tape is at rest.

Migration of silver ions through the separator tape to reach the zinc anode will also occur while the cell is in operation. If the tape is held motionless between the electrodes for long enough to produce effective utilization of all the depolarizer coating on it at one time, this gives time for silver ions to migrate through the tape separator, reach the zinc anode, and deposit on it. Increasing the tape thickness, in order to lengthen the silver ion migration path, is not the answer, because this increases the internal resistance of the cell, leading to power losses. An ion exchange membrane used as the tape base could block this silver ion migration, but this would not permit the rapid discharge of the cell obtained with permeable separators. However, it is found that anode fouling by silver deposition can be obviated by advancing the tape substantially continuously during operation of the cell. With continuous advancement, the rate of movement of the coated tape past the electrodes is faster than the rate of migration of silver ion through the tape, even at quite slow rates of travel.

Accordingly, the cell of this invention, in an especially preferred embodiment thereof, is provided with means for automatically advancing the coated tape through the space between the electrodes substantially continuously during operation of the cell, by means of a spring drive, an electric motor driven by part of the power output of the cell, or the like, at a rate sufficient to maintain a substantially invariant system.

It is found that in such a dynamic system, effective utilization of the silver peroxide can readily be combined with substantially complete prevention of silver deposition on the anode, providing efficient operation of the cell while maintaining a steady power output.

The separator tape carrying the silver peroxide coating must be wetted with electrolyte as it contacts the electrodes. In a preferred embodiment of the present invention, the means employed to wet the silver peroxide-coated separator tape with electrolyte is a second tape.

In operating the cell of this invention, it is important to avoid getting loose silver peroxide between the electrodes. Silver peroxide is electronically conductive, and will short-circuit the cell by providing an electronically conductive path between the electrodes if it touches both electrodes. To insure against this, the peroxide coating on the separator tape may be placed only over the center of the tape, leaving a band of uncoated tape at each edge. Alternatively, this tape can be coated out to its edges, and be underlaid by a slightly wider, uncoated tape as it passes between the electrodes. Either system provides a margin of uncoated tape as the tape passes between the electrodes, so that if any of the silver peroxide becomes detached from the tape close to its edge, the peroxide is prevented from getting in a position to contact both electrodes.

The dual tape system also has a further advantage, in preventing deposition of metallic silver on the zinc electrode. The rate of advance of the tape between the electrodes is desirably slow, so that a reasonably small roll lasts a good length of time. A slow rate of advance of the tape allows more time for silver ion to migrate through the tape to the zinc anode. Increasing the tape thickness to prevent this raises the internal resistance of the cell. It has been found that the dual tape arrangement in which a second tape supplies the electrolyte to the first, coated, tape is particularly effective in preventing access of silver ion to the zinc electrode, while maintaining a minimum thickness of tape between the electrodes.

Especially advantageously in this connection, the dual tape system comprises a thicker and more permeable tape as the electrolyte carrier, and a thinner and less permeable tape as the silver peroxide carrier. With the tapes in these relative proportions, internal cell resistance is especially effectively minimized. Specific thicknesses and permeabilities will vary, depending on factors such as the geometry of the system, rate of travel of the tape, and so forth.

The mode of operation of the presently provided cell will be apparent from a consideration of the drawings in which FIGURE 1 represents a diagrammatic side view of a fuel cell as provided by this invention. In the embodiment represented in this drawing, a dual tape separator system is employed. The system includes a roll of permeable separator tape 1, having on one side a coating of silver peroxide, adhered to the tape by a water-soluble polymeric binder; and a roll of uncoated permeable separator tape 2, which is wetted by the electrolyte. In the embodiment of the cell illustrated, means are provided for wetting the tape 2 with electrolyte by a gravity feed comprising a container 3 of electrolyte 4, such as 30–40% aqueous KOH, stoppered by a spherical or cylindrical rolling closure 5 which turns and feeds out the electrolyte 4 as it is contacted by the tape 2.

The silver peroxide-coated tape 1 and the KOH-wetted tape 2 meet in face-to-face contact, with the $Ag_2O_2$-coated side of tape 1 on the outside of the assembly, as the tapes pass under guide roller 6. A sliding cathode structure such as a plate 7 of inert, conductive material such as silver is connected to a take-off lead 10. The inert conductive cathode 7 is mounted on a resilient support 8, behind which is a backing plate 9, providing the cathode assembly contacted by the silver peroxide, coated external side of the tapes. The other side of the dual tape assembly contacts a sliding anode, consisting of an anode structure such as a plate 11 of zinc, connected to a lead 14. The zinc anode plate 11 is mounted on top of a resilient support 12, behind which is a backing plate 13. The resilient layers 8 and 12 behind the electrode plates 7 and 11 may be made of a cellular material such as foam rubber or the like. They are used to permit the electrodes to contact the tapes tightly enough to provide a good electrical connection from the cathode to the anode, but not so tightly as to interfere with passage of the tapes between the electrode plates. A cam 15 in the position shown releases the zinc anode sliding electrode plate from contact with the tapes. When the cam 15 is rotated to the horizontal position shown by dotted lines, it presses the anode against the tapes, which are in turn pressed against the cathode plate, to provide good physical contact through from anode to cathode. 16 and 17 are spike-toothed rollers, at least one of which is driven by means such as a spring, a motor (which may be an electric motor actuated by part of the power generated by the cell) or the like. The teeth on rollers 16 and 17 bite into the tapes 1 and 2, and pull them up between the cathode 7 and anode 11. A band drive 18 connects spike-toothed roller 16 with a take-up roller 19 on which the dual tapes, exhausted of reactants after being passed between the anode and cathode, are wound up.

FIGURE 1a is a perspective view of illustrative means for advancing the tapes between the electrodes. Spike-toothed roller 16 is connected by a shaft 20 to a spring 21 which drives roller 16 on being wound up. For steady continuous advancement of tapes by a spring drive, if desired the connection from the roller drawing the tapes to the drive spring may be made through a series of gears, hair springs, ratchets and the like (for instance, as provided in clock mechanisms), to provide a uniform torque at the roller. The roller or rollers drawing tapes between the electrodes, instead of the spike-toothed arrangement shown for catching the tapes, can be provided with other means to grip the tapes, such as roughened surfaces or the like.

FIGURE 2 is a side cross-sectional view of the coated tape of the invention, in enlarged detail. 22 is a layer of silver peroxide mixed with a water-soluble polymeric binder, coated on and adhering to a permeable synthetic polymer tape base 23.

FIGURE 3 is a perspective view of the dual tape system, showing placement of the coated tape 1 centrally on the wetted tape 2.

To operate the cell, the drive means for rollers 16 and 17 is actuated: cam 15 is turned to press the zinc anode 11 into contact with the wetted tape 2, pressing it against coated tape 1, which in turn is pressed against the cathode; and leads 10 and 14 from the cathode and anode, respectively, are connected to a load so as to complete the electrical circuit. As the tape slides between the anode 11 and the cathode 7, electricity is generated by the electrochemical reaction of the silver peroxide and the zinc, powering the load connected into the circuit through leads 10 and 14.

In construction of the present cell, the material of which the anode is made will consist essentially of zinc: this may be a zinc alloy of which zinc provides the major constituent (more than 50% by weight zinc, and preferably more than 90% zinc )or may be zinc itself. The cathode material will be an inert conductor. This may be carbon, but is preferably metallic. Inert metallic conductors are metals higher in the electromotive series than zinc (so that zinc goes into solution in electrolyte which both contact, in preference to such metals), and which are not subject to corrosive attack by the electrolyte. The noble metals are advantageous materials for cathode construction in the cell of this invention, particularly gold and silver, and silver is preferred.

The cell of this invention is preferably constructed with sliding electrodes. Sliding electrodes have an elongated surface in contact with the tape separator between them, as compared to roller-shaped electrodes, which maintain a line contact while they turn pressing the separator between them.

Sliding electrodes, because of their greater contact surface, generally operate with a lower current density then rolling electrodes. It has been found that the coating of silver peroxide on a tape carrier as provided herein is sufficiently adherent so that despite the rubbing action of sliding electrodes between which it passes, the coating does not rub off. Thus, the advantageous use of sliding electrodes is permissible.

The cathodic and anodic sliding electrodes can be flat plates, sheets, bars or foils having a continuous surface. They can also be mesh, such as expanded metal mesh, gauze, or a like discontinuous configuration with open spaces. The use of mesh, screen, or the like, as the electrodes is sometimes advantageous in maximizing firm contact of the tapes with the electrodes.

The anode and cathode may have about the same surface dimensions, so that they contact equal areas of the tape, but the thickness of the structure of inert material serving as cathode can be small as compared to that of the zinc anode, since the inert cathode is not consumed in the electrochemical reaction, whereas the zinc anode is.

The electrolyte used to wet the tape separator can be any electrically conductive solution. In general, strong aqueous alkali solutions, such as those containing 30–40% by weight of an alkali metal hydroxide, are preferred. KOH is advantageous.

The means used to wet the tape with the electrolyte can vary. As noted above, the tape to which the electrolyte solution is applied can be either the peroxide-coated tape or, as in the preferred dual tape system described above, a second, permeable tape which contacts the first, peroxide-coated tape and travels with it between the electrodes. The electrolyte solution may be applied to the second tape before this is placed in the cell, when a dual tape system is used. If desired, one or the other tape can be impregnated with dry electrolyte, e.g., KOH, and then wet with water to produce the electrolyte solution in the tape subsequently. The electrolyte solution can be fed onto the tape separator so as to contact it through one of the electrodes, using a porous zinc anode as the feed site, for example. The tape can be wetted by electrolyte solution as it travels towards the electrodes, as illustrated in FIG. 1, and so forth.

The silver peroxide-coated tapes employed in the cell of this invention can be made of any of a wide variety of substrate materials and binders. However, a particularly advantageous tape is provided by this invention as set forth herein, comprising a permeable nonwoven, alkali-resistant synthetic polymer base to which the silver peroxide is adhered by a water-soluble binder.

The tape separator must be permeable, having void spaces through which liquid can travel from face to face, to permit electrolytic contact between the anode and cathode, through absorption of the electrolyte in the separator. If it is so permeable that particles of the silver peroxide can drop through it, this peroxide will be reduced at the zinc anode and thus lost to the electrochemical energy-producing reaction. The silver peroxide employed to coat the tape may have a very small particle size: for example, it may be all below 44 microns, and more than 75% in the 0.5–2.5 micron size range. If the tape is not permeable enough to let the electrolyte penetrate through it rapidly to reach the silver peroxide, the internal resistance of the cell increases, and it is not possible to discharge the cell at a high rate. If the tape surface is not smooth, the electrodes do not contact it evenly over its entire surface, with consequent loss of capacity.

It is found that a permeable non-woven material, and particularly, a non-woven fibrous fabric material is an especially advantageous material for the tape base of the peroxide-coated tapes of this invention. While a woven fabric base has an irregular surface, preventing complete physical contact with flat electrode plates, and generally has a sufficiently open weave to permit particles of the silver peroxide to penetrate to the anode, non-woven materials can be obtained with flat, quite smooth surfaces, coupled with substantial permeability to liquids, without having large enough holes in their structures to permit peroxide particles to fall through. For example, such non-woven fibrous fabric materials can be obtained by compressing and heating a mat of polymeric fibers; while an adhesive, such as polyvinyl alcohol, for example, may be used as a binder in preparing such fibrous fabrics, particularly with thermoplastic fiber materials, the use of a binder is not necessary. In general, such non-woven fibrous fabric materials are free of the direct open void spaces extending from face to face which are characteristic of woven fabrics, and yet have substantially permeability to liquids. Permeable materials such as porous plastic films may also be used as tape bases, but at the small pore size preventing penetration by peroxide particles, these generally do not permit sufficiently rapid penetration by the electrolyte, resulting in limiting the cell to low discharge rates. On the other hand, non-woven fibrous fabric materials provide an advantageously suitable intermediate permeability, coupled with a smooth surface face, permitting penetration by liquid electrolyte while limiting penetration by peroxide particles.

The tape base can be made of any of a variety of materials, such as paper, cellulosics such as rayon, or the like. However, when the tape is to be pulled to draw it between electrodes as in the illustrated embodiment of the cell of this invention, the base is desirably a material resistant to attack by the electrolyte employed in the cell. Strong alkali solutions attack cellulosic materials, and accordingly, a preferred material for the tape base is one inert to the action of aqueous alkali, such as an inert synthetic polymer, and particularly, a fiber-forming alkali-resistant synthetic polymer. A variety of alkali-resistant film- and fiber-forming polymeric materials are known which may be used in this connection, including for example a nylon (polyhexamethylene adipamide, polycaprolactam, polyhexamethylene sebacamide or the like), a hydrocarbon polymer such as polypropylene, an ester such as polyethylene terephthalate, a nitrile polymer such as polyacrylonitrile, and so forth.

The materials resistant to alkali attack, such as nylon and polypropylene, are also generally more resistant to oxidation by silver peroxide than the cellulosics. As is known, cellulosics like paper are attacked by silver peroxide in an aqueous medium, which leads to loss of the active silver material during coating, and weakens the base material. Therefore the synthetic polymer materials are particularly advantageous bases in this connection.

Essentially the same considerations apply to the electrolyte carrier tape as to the peroxide carrier tape in the dual tape system. Permeability coupled with freedom from open void spaces, alkali resistance and a smooth surface are desirable. Thus, an alkali-resistant synthetic polymer non-woven fibrous fabric material is suitably employed for this tape also. In general, this electrolyte carrier tape desirably has greater permeability than the peroxide-coated tape, say 2 to 10 times the void space, and it may also desirably be somewhat thicker, say 2 to 4 times as thick, though variation can be made from these ratios.

In the preferred peroxide-coated tape provided by the present invention, the silver peroxide is adhered to the tape base with a binder. Simply pressing the peroxide onto the surface of the tape produces some adherence, but the coating produced is brittle and tends to crack off. Useful binders must be flexible and must provide a coating permeable to the electrolyte, so that this can reach the peroxide to complete the electrochemical system. Materials forming useful binders are water-soluble polymers, that is, polymers which are wetted and swollen or dissolved by water and by aqueous alkali, including for example synthetic polymers such as polyvinyl alcohol, hydroxyethyl cellulose, 2-hydroxypropyl methyl cellulose, methyl cellulose, carboxymethyl cellulose, polymethacrylic acid, polyvinyl pyrrolidone, soluble starch, alginic acid or the like. The ability of cationic polymers such as those containing carboxylic acid or salt groups to form insoluble silver salts may interfere with practice of the present invention, and in general, oxy compounds such as the hydroxy-substituted polymers like polyvinyl alcohol, the ethers like methyl cellulose and the hydroxyalkyl ethers such as the hydroxypropyl methyl cellulose polymers are preferred binders; those including hydroxy substituent groups are especially rapidly wetted by the alkaline electrolyte and are particularly preferred.

To produce the peroxide-coated tape of this invention, a mixture of silver peroxide with a water-soluble binder in an aqueous medium is coated onto a permeable, alkali-resistant synthetic polymer tape, and the water is evaporated off to provide a dry coating on the tape. It is desirable to make the coating consist chiefly of the active depolarizer, with only enough binder to hold it firmly to the tape, and generally the weight ratio of silver peroxide to water-soluble polymeric binder is accordingly desirably 75:25 or higher. Usually at least 5% binder is needed. A mixture in which 85–95% by weight of the total is silver peroxide, remainder polymeric binder is advantageous. The mixture applied to the tape, containing water as the medium for producing a fluid coating from the polymer-peroxide mixture, can be 20–80 weight-percent water; 50–75% water is suitable. Increasing the smoothness of dispersion of the binder and peroxide in the aqueous medium appears to enhance the smoothness of the coating produced, and thorough mixing prior to application of the coating is desirable. The thickness of the layer applied is variable: depending on other parameters of the system, it is advantageous to make the coating thin enough so that much or all of the peroxide can be utilized as the tape is moved past the electrode at reasonably rapid rates of travel. When the coating has been applied to the tape, the aqueous medium is evaporated off. Exposure to excessive heating in this step can cause degradation of the peroxide, so that maintaining the coated tape at ambient temperatures such as 50–90° F. is suitable.

In an exemplary operation, a non-woven nylon fibrous fabric tape weighing about 0.035 g./in., 3–4 mils thick and with a 30% KOH retention of 0.1–0.2 g./in.$^2$ is coated with approximately 0.07 gram of silver peroxide per square inch, using a coating which is 90% silver peroxide, 10% polyvinyl alcohol. The coating is applied to the tape, prewetted with water, from an aqueous solution, 50 to 75 weight water, produced by mixing the polyvinyl alcohol and silver peroxide with water separately and then mixing the two aqueous dispersions. After the water has evaporated off, the coating adheres firmly to the tape.

The silver peroxide-coated tape is employed in a fuel cell as described in FIGURE 1, in conjunction with a separator tape which is non-woven fabric, weighing about 0.04 g./in.$^2$, with 30% KOH retention of 0.3–0.4 g./in.$^2$, and 8–10 mils thick. This tape is approximately one inch wide, and is about ⅛ inch wider than the peroxide-coated tape. The uncoated separator tape is presoaked with 30% KOH, until it is saturated but not dripping. The two tapes are fed into a cell as illustrated in FIG- URE 1, in which the cathode current collector is a silver plate ⅞ by ⅞ inch and the zinc anode is a block of zinc having a surface ⅞ by ⅞ inch bearing on the tape, and about ⅛ inch thick. The rate of travel of the tapes is 1 inch per minute. The open circuit voltage is measured at 1.55 to 1.65 volts. The current drain on the system can be increased to as much as one ampere per square inch before significant drop-off in the loaded voltage occurs. The power output of the system is 1.3 watts.

While the invention has been described with reference to specific preferred embodiments thereof, it will be appreciated that modifications and variations can be made without departure from the scope of the invention, which is limited only as defined in the appended claims.

What is claimed is:

1. A dry tape adapted for use in a tape-fed fuel cell of the silver/zinc type, comprising a coating of silver peroxide adhered by a water-soluble binder to a permeable inert synthetic polymer tape substrate.

2. The tape of claim 1 in which said binder is polyvinyl alcohol.

References Cited

UNITED STATES PATENTS 3,260,620   7/1966   Gruber _____ 136—6 XR

WINSTON A. DOUGLAS, *Primary Examiner.*

DONALD L. WALTON, *Assistant Examiner.*

U.S. Cl. X.R.

117—34; 252—511; 136—137